United States Patent

Lammers

[11] Patent Number: 5,967,410
[45] Date of Patent: Oct. 19, 1999

[54] THERMAL RELIEF VALVE

[75] Inventor: Daniel A. Lammers, St. Louis, Mo.

[73] Assignee: Control Devices, Incorporated, St. Louis, Mo.

[21] Appl. No.: 09/224,223

[22] Filed: Dec. 30, 1998

[51] Int. Cl.⁶ ..................................................... F16K 17/00
[52] U.S. Cl. ..................... 236/93 R; 236/92 C; 236/100; 236/99 J; 236/99 K
[58] Field of Search ................................ 236/93 R, 92 C, 236/100, 99 J, 99 K, 50, 52, 54, 56; 251/356

[56] References Cited

U.S. PATENT DOCUMENTS

| | | | |
|---|---|---|---|
| 2,505,321 | 4/1950 | Brutocao et al. | 236/61 |
| 2,731,207 | 1/1956 | Mueller et al. | 236/92 |
| 4,285,465 | 8/1981 | North | 236/12 |
| 5,641,119 | 6/1997 | Simonette | 236/92 |

OTHER PUBLICATIONS

Two Drawings, numbered TRV25–0AA and Sketch 5, entitled "Thermal Relief Valve," Control Devices, Inc., admitted by applicant to be prior art.

*Primary Examiner*—Henry Bennett
*Assistant Examiner*—Marc Norman
*Attorney, Agent, or Firm*—Senniger, Powers, Leavitt & Roedel

[57] ABSTRACT

A thermal relief valve to be mounted in a fluid flow line. The valve comprises a valve body and a valve actuator movable in a bore defined by a bore wall in the valve body from a sealing position in which the actuator sealingly engages a valve seat to block flow through the valve to a non-sealing position. The valve actuator is responsive to the temperature of the fluid exceeding a predetermined temperature to move to its non-sealing position. The relief valve has an actuator body configured to have first exterior surfaces sized for a close clearance fit with the bore wall at spaced locations around the actuator body to prevent substantial lateral shifting of the body relative to the bore wall, and second exterior surfaces which extend between the first exterior surfaces and which are spaced farther from the bore wall to define flow passages to permit the flow of fluid past the actuator when the valve actuator moves to its non-sealing position.

6 Claims, 2 Drawing Sheets

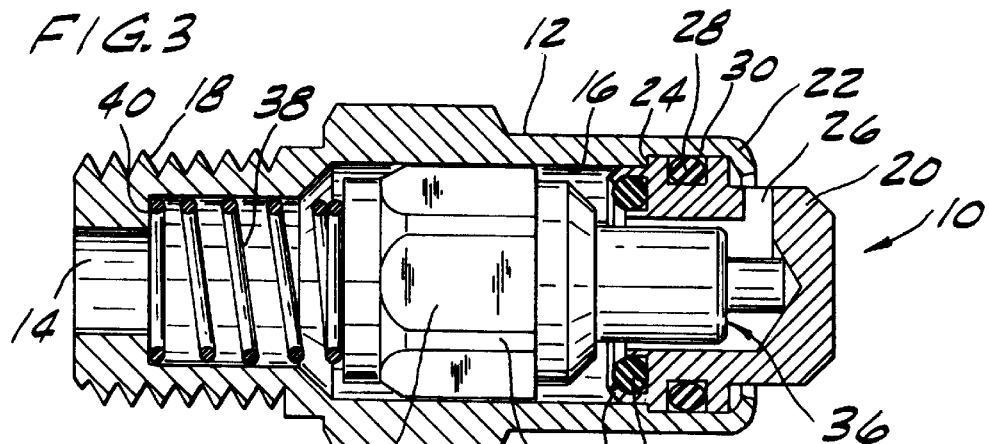
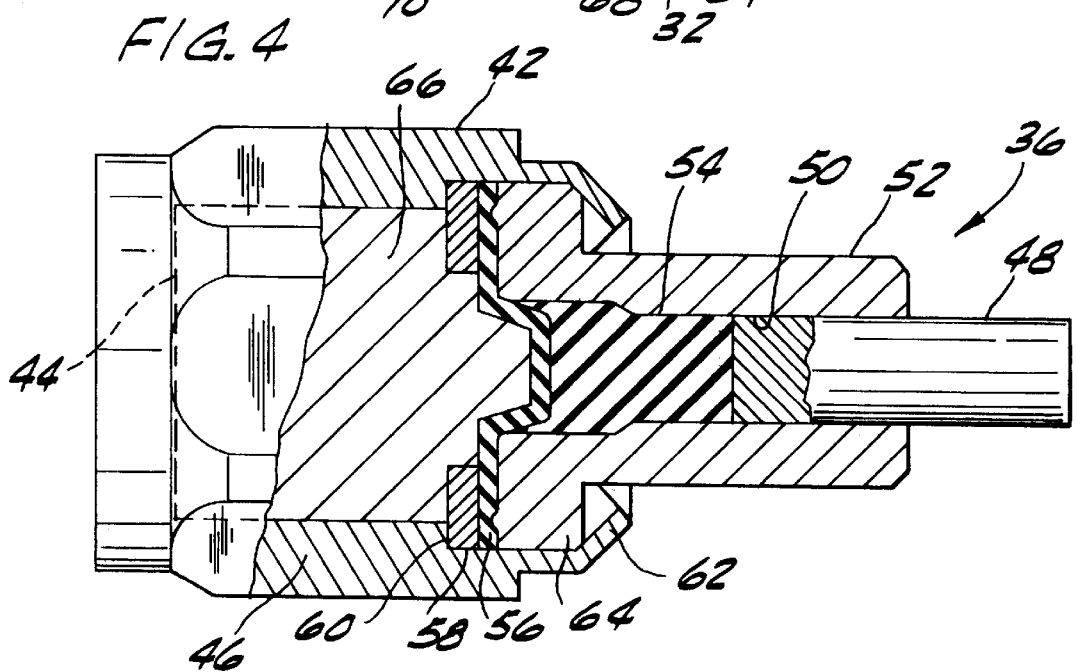
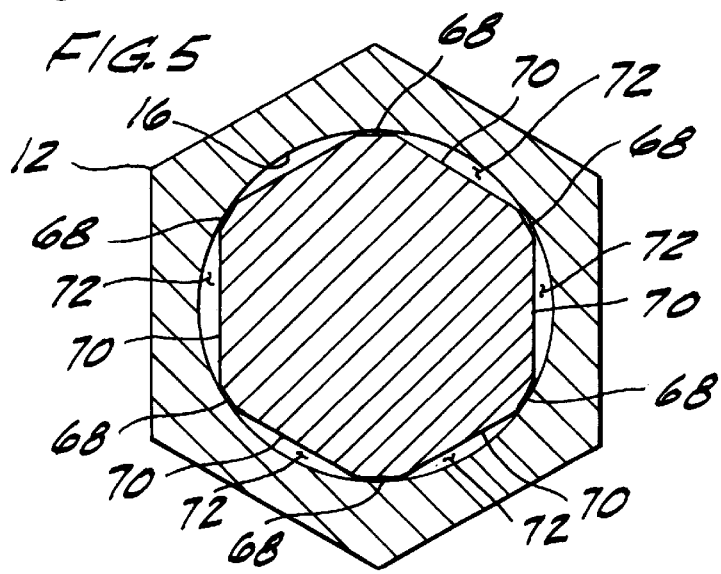

THERMAL RELIEF VALVE

BACKGROUND OF THE INVENTION

This invention relates generally to relief valves in piping systems and, more particularly to a relief valve which is heat sensitive.

A substantial concern in the operation of fluid systems that may be exposed to local temperature gradients is thermal damage to system components. Exposure to heat is prevalent among fluid systems, as tubes and pipes are frequently located nearby heat-generating components of machines and industrial equipment. When heat is transferred into a pipe, fluid temperature can rise to levels that leave components served by the piping system susceptible to damage. Therefore, thermal relief valves are frequently included in fluid systems to prevent damage. When fluid temperature exceeds a predetermined limit, thermal relief valves open to vent hot fluid and permit entry of cooler fluid.

More specifically, this invention relates to an improved thermal relief valve of the type described in U.S. Pat. No. 5,641,119, which is incorporated herein by reference. In that patent, a thermal relief valve is described as suitable for conventional or miniature fluid piping systems. The thermal relief valve includes a cylindrical valve body with a bore that houses a thermal actuator. The actuator has a piston and wax that melts and expands at a predetermined temperature. When fluid temperature exceeds the predetermined level, wax expands and causes the piston to extend, thereby moving the thermal actuator axially within the housing. The actuator moves from its normal closed position in which the actuator engages an O-ring seal to an open position in which the actuator unseats from the O-ring and forms a gap therebetween. Fluid may then pass through the valve, flowing first through an annular passage between the circular exterior of the thermal actuator and the circular interior wall of the bore in the valve body that houses the actuator. The fluid next flows through the gap adjacent the O-ring seal and exits the valve.

One drawback to thermal relief valves of this type is that in use they exhibit a high susceptibility to O-ring wear. Valves are frequently exposed to environments of severe vibration. Although the thermal actuator in its closed position is constrained from moving axially, being pressed against the O-ring by a spring, the actuator is not constrained from moving laterally. Specifically, the actuator can shift and vibrate in a side-to-side direction within the housing. As it moves, the annular passage between the thermal actuator and the interior wall of the bore in the valve body becomes irregular, wider on one side than on an opposite side, since the actuator is intermittently off-center within the bore. The actuator rubs against the O-ring seal, maintaining a sealing contact against it, but causing wear on the O-ring. The eventual results are leakage and a need for recurrent O-ring replacement.

SUMMARY OF THE INVENTION

Among the several objects of this invention may be noted the provision of an improved thermal relief valve of the type described above; the provision of such a valve which is configured to reduce wear on the seal in the valve; the provision of such a valve which increases the positional stability of the actuator component of the valve; the provision of such a valve which is economical to manufacture; and the provision of such a valve which is reliable in operation.

In general, a thermal relief valve of this invention comprises a valve body having a longitudinal bore defined by a bore wall, a valve seat in the bore, a valve actuator movable in the bore from a sealing position in which the actuator sealingly engages the valve seat to block flow through the bore to a non-sealing position in which the actuator is spaced from the valve seat to permit said flow, and a spring urging the valve actuator toward said sealing position. The valve actuator is responsive to the temperature of the fluid exceeding a predetermined temperature to move against the urging of the spring to said non-sealing position. The thermal relief valve is characterized in that the valve actuator has an actuator body configured to have first exterior surfaces sized for a close clearance fit with the bore wall at spaced locations around the actuator body to prevent substantial lateral shifting of the body relative to the bore wall, and second exterior surfaces which extend between the first exterior surfaces and which are spaced farther from the bore wall to define flow passages to permit the flow of fluid past the actuator only when the valve actuator moves to said non-sealing position.

Other objects and features will be in part apparent and in part pointed out hereinafter.

BRIEF DESCRIPTION OF THE DRAWINGS

FIG. 3 is a view similar to FIG. 1 showing the actuator in an open position;

FIG. 4 is a view similar to FIG. 2 showing the actuator in its open position; and FIG. 5 is a sectional view taken on line 5—5 of FIG. 1.

Corresponding parts are designated by corresponding reference numbers in the drawings.

DETAILED DESCRIPTION OF THE PREFERRED EMBODIMENT

Figure 1:
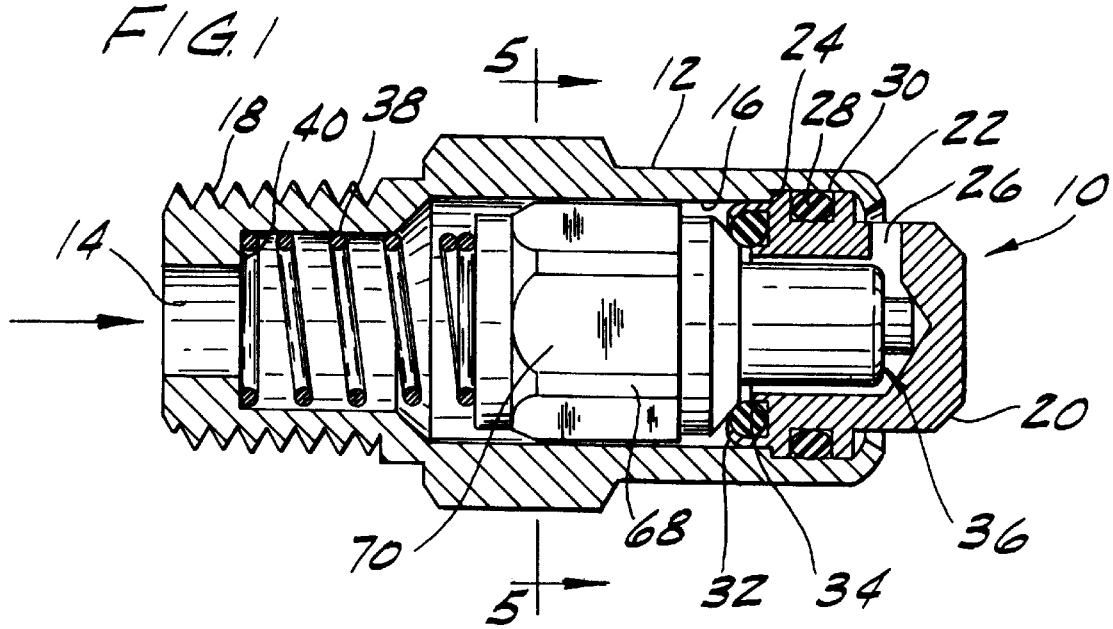
FIG. 1 is a sectional view of a thermal relief valve of the present invention, the heat-sensitive actuator of the valve being shown in a closed position to seal against flow through the valve.
Figure 2:
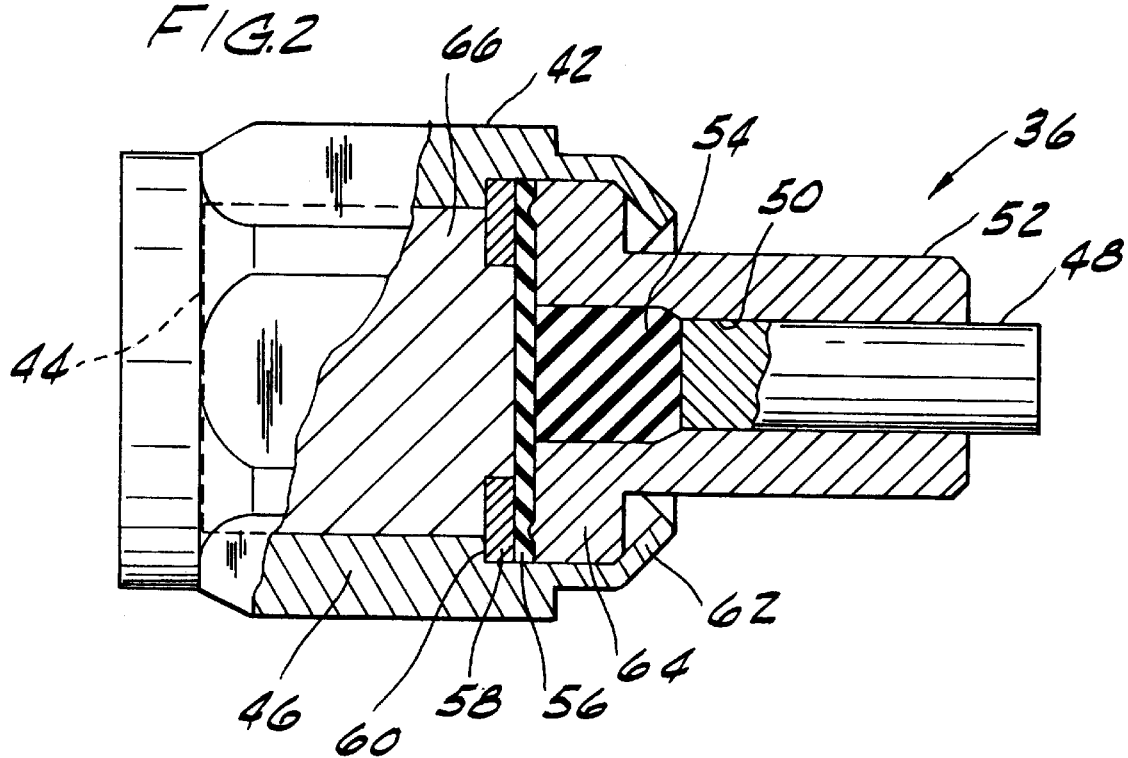
FIG. 2 is a side elevation of the valve actuator of FIG. 1 with parts being shown in section to illustrate internal details.

Referring now to the drawings, and first more particularly to FIGS. 1 and 2, a thermal relief valve of the present invention is designated in its entirety by the reference numeral 10.

As shown, the valve 10 comprises a valve body 12 having a central longitudinal bore 14 therethrough defined by a bore wall 16. The body 12 is externally threaded at its upstream inlet end 18 for attachment to a fluid flow line (not shown), flow being from left to right as viewed in FIG. 1. A valve cap 20 is fitted in the downstream (right) end of the valve body 12 and secured in position between a crimped end portion 22 of the valve body and a first internal shoulder 24 spaced from the end of the body. The cap 20 is generally cup-shaped and has a generally radial passage 26 formed therein which communicates with the bore 14 through the valve body 12, the radial passage constituting the outlet of the valve 10. A first O-ring seal 28 received in a circumferential groove 30 in the cap 20 seals against the wall 16 of the bore 14 to prevent leakage therepast. The cap 20 has an annular retainer 32 at its upstream end holding a second O-ring 34 which constitutes a seat for a valve actuator in the bore 14, the valve actuator being generally indicated at 36.

As best illustrated in FIGS. 1 and 3, the valve actuator 36 is movable in the bore 14 of the valve body 12 from a sealing position (FIG. 1) in which the actuator sealingly engages the second O-ring 34 of the cap 20 to prevent flow through the bore, to a non-sealing position (FIG. 3) in which the actuator is spaced from the seal to permit flow therepast to the outlet 26. A spring 38 in the bore 14, reacting at one end against a second internal shoulder 40 on the valve body 12 and at its other end against the valve actuator 36, urges the actuator toward its stated sealing position. The actuator 36 is responsive to the temperature of the fluid exceeding a predetermined temperature to move against the urging of the spring 38 to the non-sealing position shown in FIG. 2. This is described in more detail below.

Referring to FIG. 2, the valve actuator 36 comprises a cup-shaped body 42 having an end wall 44 and a side wall 46 extending from the end wall and defining a cavity inside the body. The actuator 36 also includes a plunger or stem 48 mounted in a bore 50 in an elongate head 52 at the downstream end of the body 42, the head, bore and stem being generally coaxial with the longitudinal axis of the actuator and the central longitudinal axis of the bore 14 in the valve body 12. The stem 48 projects endwise beyond the downstream end of the head 52 for engagement with the cap 20, as shown in FIG. 1. A rubber plug 54 is disposed in the bore 50 of the head 52. upstream of the stem 48. The head 52 is separated from the cavity of the actuator body 42 by a flexible (e.g., rubber) diaphragm 56 held in place between the head and a retaining ring 58 (e.g., a brass washer) seated against an internal shoulder 60 around the inside of the cavity. A circular flange 62 projects from the side wall 46 of the body 42 around an enlarged base 64 of the head 52 and is crimped at its outer (downstream) end against the base to hold the various parts of the actuator 36 in assembly.

The cavity in the actuator body 42 is filled with a suitable expansible material 66. In practice, it has been found that a wax comprising a blend of paraffin wax (54% by weight), polyethylene homopolymer (5%) and powdered metal (41%) is effective, although other materials may also be suitable. When heated above a predetermined temperature (e.g., 140° Fahrenheit), the material 66 expands, causing the diaphragm 56 to deform and the stem 48 to extend to push the actuator 36 away from the valve seat at the second O-ring 34 against the urging of the spring 38, thereby allowing fluid flow through the valve 10 (See FIGS. 3 and 4). The movement of the stem 48 need not be large, and in the preferred embodiment it is less than about 0.100 inches.

In accordance with this invention, and as shown in FIG. 5, the body 42 of the actuator 36 is configured to have first exterior surfaces 68 sized for a close clearance fit with the wall 16 of the bore 14 through the valve body 12 at spaced locations around the circumference of the actuator body 42 to prevent substantial lateral shifting of the body 42 relative to the bore wall. Second exterior surfaces 70 extend between the first exterior surfaces 68 and are spaced farther from the bore wall 16 to create substantial gaps 72 defining flow passages that permit the flow of fluid past the valve actuator 36 when the actuator moves to its non-sealing position.

Preferably, the bore wall 16 is generally circular in transverse cross section and the actuator body 42 is generally polygonal in transverse cross section. In the preferred embodiment shown in the drawings, the body 42 is generally hexagonal in cross section. In this embodiment, the aforesaid first exterior surfaces 68 comprise a plurality of narrow flats extending lengthwise of the body 42 at apexes of the hexagonal cross section of the body, and the aforesaid second exterior surfaces 70 comprise a plurality of wide flats extending lengthwise of the body between the narrow flats. The clearance between the narrow flats 68 and the bore wall 16 is preferably about 0.002–0.010 inches, but this range may vary. Small clearances are preferred because this decreases the radial distance which the actuator 36 can shift laterally in the bore 14, thus reducing the abrasion and wear on the seal at second O-ring 34 constituting the seat of the valve 10.

It will be understood that the body 42 of the actuator 36 can take other shapes without departing from the scope of this invention. For example, the body 42 could be formed with ridges extending along the body to provide a close clearance fit within the valve bore 14 while still permitting flow therepast. Alternatively, the actuator body 42 could be elliptical or have other non-circular shapes, so long as portions of the actuator 36 have a close clearance fit within the valve bore 14 to prevent substantial lateral shifting of the actuator relative to the valve seat O-ring 34, and so long as other portions of the actuator have loose clearance fits to form fluid flow channels that permit the appropriate flow past the actuator when it moves to its non-sealing position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A thermal relief valve adapted to be mounted in a fluid flow line, said valve comprising:

a valve body having a longitudinal bore defined by a bore wall;

a valve seat in the bore;

a valve actuator movable in the bore from a sealing position in which the actuator sealingly engages the valve seat to block flow through the bore to a non-sealing position in which the actuator is spaced from the valve seat to permit said flow; and a spring urging said valve actuator toward said sealing position, the valve actuator being responsive to the temperature of the fluid exceeding a predetermined temperature to move against the urging of said spring to said non-sealing position, said thermal relief valve being characterized in that the valve actuator has an actuator body configured to have first exterior surfaces sized for a close clearance fit with said bore wall at spaced locations around the actuator body to prevent substantial lateral shifting of the body relative to the bore wall, and second exterior surfaces which extend between the first exterior surfaces and which are spaced farther from the bore wall to define flow passages to permit the flow of fluid past the actuator when the valve actuator moves to said non-sealing position.

2. A thermal relief valve as set forth in claim 1 wherein said bore wall is generally circular in transverse cross section and said actuator body is generally polygonal in transverse cross section.

3. A thermal relief valve as set forth in claim 2 wherein said first exterior surfaces comprise a plurality of narrow flats extending lengthwise of the body at apexes of said polygonal cross section of the actuator body.

4. A thermal relief valve as set forth in claim 3 wherein said second exterior surfaces comprise a plurality of wide flats extending lengthwise of the body between said narrow flat.

5. A thermal relief valve as set forth in claim 4 wherein said narrow flats and said bore wall have a clearance therebetween of about 0.002 in.–0.010 in.

6. A thermal relief valve as set forth in claim 5 wherein said actuator body is generally hexagonal in transverse cross section.

\* \* \* \* \*